Figure 1:
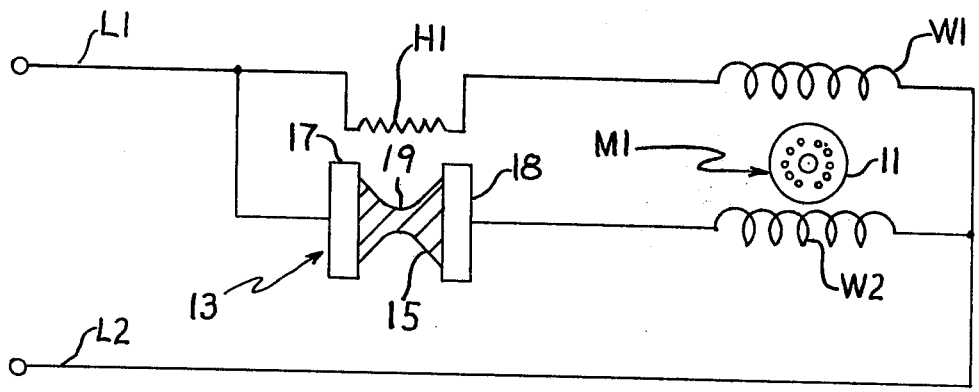

United States Patent [19]
Epstein et al.

[11] 3,879,685

[45] Apr. 22, 1975

[54] MOTOR STARTING SYSTEM INCLUDING THERMAL RESPONSIVE MEANS FOR SELECTIVELY DISRUPTING THE POWER BEING SUPPLIED TO THE START WINDING

[75] Inventors: Henry David Epstein, Cambridge; William A. Broadley, East Walpole, both of Mass.

[73] Assignee: Texas Instruments Incorporated, Dallas, Tex.

[22] Filed: Nov. 13, 1969

[21] Appl. No.: 871,630

Related U.S. Application Data
[63] Continuation of Ser. No. 675,891, Oct. 17, 1967.

[52] U.S. Cl. ............................. 318/221 H; 318/229
[51] Int. Cl. ............................................. H02p 1/44
[58] Field of Search ............ 318/320, 221 H, 221 R, 318/229

[56] References Cited
UNITED STATES PATENTS
2,261,250  11/1941  Haddad............................ 318/221

FOREIGN PATENTS OR APPLICATIONS
1,042,126  9/1966  United Kingdom................ 318/221

*Primary Examiner*—G. Z. Rubinson
*Attorney, Agent, or Firm*—James P. McAndrews; John A. Haug; Edward J. Connors, Jr.

[57] ABSTRACT

In the motor starting system disclosed herein, the start winding of an induction motor is connected in series with a mass of material which has a resistance characteristic having a positive temperature coefficient and a sharply defined transition temperature above which the material's resistance increases sharply. When power is applied to the motor, the initially low resistance of the mass allows the start winding to be substantially energized. After a predetermined delay, the mass of material heats to its transition temperature and the resulting increase in resistance substantially reduces the energization of the start winding thereby controlling the timing of the start cycle. The increased resistance of the mass upon heating also functions to protect the start winding from damage caused by prolonged overloads since increase current flow produces an increase in the resistance of the mass.

1 Claim, 2 Drawing Figures

PATENTED APR 22 1975　　　　　　　　　　　　　　　　3,879,685

Henry D. Epstein and
William A. Broadley,
Inventors.
Koenig, Senniger, Powers and Leavitt,
Attorneys.

MOTOR STARTING SYSTEM INCLUDING THERMAL RESPONSIVE MEANS FOR SELECTIVELY DISRUPTING THE POWER BEING SUPPLIED TO THE START WINDING

This invention relates to a motor starting system and, more particularly, to such a system which employs solid state components for deenergizing a starting winding after a preselected interval without the use of mechanical contacts.

Single phase a.c. motors typically employ two windings, a main winding which is energized during both starting and running and a starting winding which is energized only until the motor comes up to a substantial portion of its running speed. This starting winding is provided with current which is shifted in phase with regard to the current provided to the main winding, as by a combination of resistance and reactance of the starting winding or by a conventional starting capacitor. The starting winding is energized together with the main winding when the motor is started and is then deenergized when the motor reaches a substantial portion of its running speed. Heretofore the deenergization has been conventionally accomplished by a centrifugal switch which responds to motor speed. Such switches, however, since they employ mechanical contacts, have typically been relatively unreliable and have been a source of maintenance problems. Further, such switches are not easily employed in hermetically sealed motor constructions such as those used in refrigeration compressors.

Among the several objects of the present invention may be noted the provision of an electric motor starting system which will reduce the energization of an auxiliary or starting winding after a preselected interval without the use of mechanical contacts; the provision of such a system which protects the starting winding from overloads; the provision of such a system which provides capacitor-start, capacitor run operation; the provision of such a system which permits the use of inexpensive capacitors; the provision of such a system which is suitable for use with hermetically sealed motors; the provision of such a system which employs solid state components; the provision of such a system which operates automatically; and the provision of such a system which is simple and inexpensive and which is reliable in operation. Other objects and features will be in part apparent and in part pointed out hereinafter.

Briefly, the present invention relates to a starting system for an electric motor of the type having a main or running winding and a starting winding. The system includes a mass of material which has a resistance characteristic having a positive temperature coefficient and a sharply defined transition temperature above which the material's resistance increases sharply. A first circuit is provided for connecting the main winding across a source of electric power and a second circuit is provided for connecting the starting winding and the mass of material in series across the source. When both of the windings are initially energized, the mass of material is heated by the flow of current therethrough. After a preselected interval, the mass of material reaches its transition temperature and the energization of the starting winding is substantially reduced by the increase in resistance of the material.

The invention accordingly comprises the constructions hereinafter described, the scope of the invention being indicated in the following claims.

Figure 2:
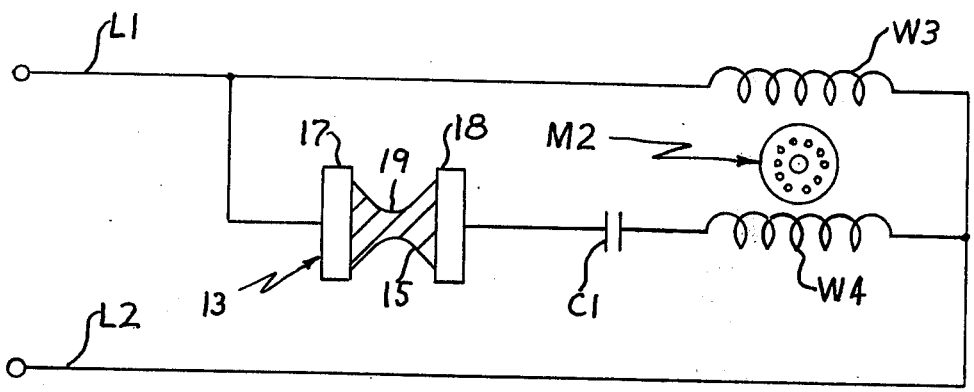

In the accompanying drawings, in which several of various possible embodiments of the invention are illustrated, FIG. 1 is a schematic circuit diagram of an electric motor starting system of this invention; and FIG. 2 is a schematic circuit diagram of a modification including a starting capacitor for shifting the phase of current applied to a starting winding.

Corresponding reference characters indicate corresponding parts throughout the several views of the drawings.

Referring now to FIG. 1, there is indicated at M1 a split-phase induction motor having a main winding W1, a start winding W2 and a conventional squirrel-cage rotor 11. A.c. power for energizing windings W1 and W2 may be obtained through a pair of supply leads L1 and L2 which may be connected to any convenient source or supply mains (not shown).

Start winding W2 is connected across leads L1 and L2 through a PTC thermistor switching element indicated generally at 13. Element 13 includes a mass of material indicated at 15 and a pair of conductive heat sinks 17 and 18. The mass 15 is preferably constructed in substantially the form illustrated having a relatively narrow neck portion 19 so that a concentrated area of heating at the narrow neck portion can cause a relatively large resistance to appear in series with winding W2. Heat sinks 17 and 18 cause the mass 15 to cool when the motor is deenergized at a rate corresponding to the rate at which the motor cools. For hermetically sealed refrigeration systems in which the motor is cooled by moving fluids, the heat sinks may be provided with fins for increasing the exposure to the fluid flow.

The material comprising mass 15 possesses a resistance characteristic having a positive temperature coefficient (PTC) and a sharply defined transition temperature above which the material's resistance increases sharply. Examples of such materials are barium titanate doped with lanthanum and carbon black filled polyethylene. These materials have heretofore been employed in PTC thermistors and also in self-regulating heaters since, when such materials are supplied with a constant voltage, the power consumed falls off rapidly as soon as the transition temperature is reached. In the present invention, however, the mass 15 is employed as a switching element to essentially cut-off or reduce the current applied to winding W2 when the mass 15 is heated to its transition temperature.

Main winding W1 is connected across leads L1 and L2 in series with an auxiliary heater H1 which is positioned in heat exchange relationship with the mass 15. In this illustration mass 15 is thus subject to two sources of heating, heater H1 and also internal heating due to $I^2R$ dissipation within the mass itself. A conventional motor protector may also be incorporated in the circuit if desired.

When power is initially applied to this motor system, substantially full line voltage appears across both windings W1 and W2 and thus motor M1 starts normally. The current drawn by main winding W1 cuases heater H1 to apply heat to the mass 15 and the current drawn by the auxiliary or starting winding W2 causes heat to be generated internally within the mass. The mass 15 will heat at a rate which depends upon the thermal inertia and heat dissipation characteristics of the element 13. After a substantially predetermined interval, the mass 15 will reach its transition temperature. As noted previously, the resistance of mass 15 changes relatively abruptly when the transition temperature is reached and thus, at this point, a substantial resistance is introduced in series with the auxiliary winding W2 thereby substantially reducing its energization to a level acceptable for continuous running of the motor M1.

When the motor is deenergized, mass 15 is cooled relatively quickly by the heat sinks 17 and 18 as noted previously and thus the motor is soon ready to start again with the auxiliary winding W2 being energized through the switching element 13.

From the above description, it can be seen that the starting system of this invention provides timed energization of the starting winding of an induction motor without the use of mechanical contacts. This system is thus particularly suitable for use in hermetically sealed environments such as in refrigeration compressor systems. In such environments if a device having contacts is employed the arc generated during the making and breaking of the contacts can breakdown the refrigerant, such as Freon, forming acids which would deleteriously affect the insulating materials in the device or in some instances actually form insulating materials which would be deposited on the contacts and contiguous parts thereby changing the resistance of the circuit and the calibration of the device. It will be obvious that if a flammable refrigerant were employed it would be essential to obviate any arcing.

Further, during running and starting, the start winding is protected from overloads since the resistance of the mass of material 15 increases as increased current is drawn.

In the modification illustrated in FIG. 2, capacitor-run operation is provided in a conventional capacitor-start motor M2 having a main or run winding W3 and a start winding W4. Main winding W3 is connected directly across supply leads L1 and L2 while the start winding W4 is connected across leads L1 and L2 through a series circuit including the switching element 13 and an electrolytic capacitor C1 for shifting the phase of the current applied to winding W4.

In this embodiment, the mass 15 is heated by internal heating alone. When power is initially applied to the motor, both windings W3 and W4 are strongly energized so that the motor comes quickly up to speed, the start winding W4 being provided with current which is shifted in phase with relation to the current flowing in winding W3 by the action of capacitor C1. As motor M2 comes up to speed, the mass 15 heats to substantially its transition temperature so that a resistance is developed in series with winding W4 reducing the flow of current therethrough. Preferably, the nominal resistance value of mass 15 when heated is selected so that a significant current continues to flow through winding W4 during continuous running of the motor in order to obtain a contribution to torque from this phase shifted winding while operating electrolytic capacitors C1 at a relatively low voltage suitable for continuous operation. In this way, motor M2 may be advantageously operated with many of the characteristics of permanent split capacitor-run motors without employing the relatively expensive oil-filled capacitors usually required for full voltage operation of the auxiliary winding, as in conventional permanent split capacitor-run motors.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motor starting system for use with an electric motor having a main winding and a starting winding, said system comprising:

a capacitor connected in series with said starting winding for shifting the phase of current applied thereto, a mass of material which has a resistance characteristic having a positive temperature coefficient and a sharply defined transition temperature above which the resistance of said material increases sharply, said mass being serially connected to said starting winding and to said capacitor and having a preselected nominal resistance when heated to establish a reduced flow of current to said starting winding in order to provide a torque contribution during continuous running of the motor while permitting operation of said capacitor at a reduced voltage level, said mass being arranged in a preselected physical configuration including a neck portion having a substantially reduced thickness to provide a concentrated area of heating and a relatively large value of resistance at the transition temperature;

first circuit means for connecting said main winding across a source of electric power;

second circuit means for connecting said starting winding, said capacitor, and said mass of material in series across said source in a manner so that both of said windings are initially energized and said mass of material including said neck portion is heated by the current flowing therethrough to reach the transition temperature after a preselected interval in order to substantially reduce the energization of said starting winding; and including heat sink means for cooling said mass of material upon deenergization of said motor.

* * * * *